United States Patent
Chu et al.

(10) Patent No.: US 8,209,119 B2
(45) Date of Patent: Jun. 26, 2012

(54) ROUTE REPORTING METHOD, SYSTEM AND RECORDING MEDIUM USING THE SAME

(75) Inventors: Yen-Lee Chu, Taoyuan County (TW); Chun-Yao Hou, Taoyuan County (TW); Celine Weichun Lin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 424 days.

(21) Appl. No.: 12/492,161

(22) Filed: Jun. 26, 2009

(65) Prior Publication Data

US 2010/0274471 A1  Oct. 28, 2010

(30) Foreign Application Priority Data

Apr. 23, 2009  (TW) ................................ 98113527 A

(51) Int. Cl.
*G01C 21/00* (2006.01)

(52) U.S. Cl. ........ 701/400; 701/416; 701/425; 701/516; 701/532; 340/995.19; 345/173

(58) Field of Classification Search .................. 701/200, 701/201, 206, 208, 209, 210, 211, 400, 409, 701/410, 411, 413, 416, 516, 532, 539; 340/995.11, 340/995.16, 995.19; 345/173
See application file for complete search history.

(56) References Cited

U.S. PATENT DOCUMENTS

| | | | |
|---|---|---|---|
| 5,999,892 A | 12/1999 | Fan | |
| 6,282,494 B1 | 8/2001 | Hsu | |
| 6,941,224 B2 | 9/2005 | Fukuyasu | |
| 7,839,405 B2 * | 11/2010 | Ishii et al. | 345/427 |
| 2007/0067104 A1 | 3/2007 | Mays | |
| 2008/0201074 A1 | 8/2008 | Bleckman et al. | |

FOREIGN PATENT DOCUMENTS

| | | |
|---|---|---|
| CN | 1963393 | 5/2007 |
| TW | I274303 | 2/2007 |
| TW | 200802080 | 1/2008 |

OTHER PUBLICATIONS

"Search Report of European counterpart application", issued on Oct. 2, 2009, p. 1-p. 3.
"First Office Action of China Counterpart Application", issued on Oct. 10, 2011, p. 1-p. 4, in which the listed references were cited.

* cited by examiner

*Primary Examiner* — Gertrude Arthur Jeanglaude
(74) *Attorney, Agent, or Firm* — Jianq Chyun IP Office

(57) ABSTRACT

A route reporting method, system, and a recording medium using the same are provided. The present method detects a touch and draws a path according to a moving trajectory of the touch. When the touch is finished, a dialog block is displayed to insert route mark information in the drawn path. The aforesaid steps are repeated to draw a plurality of paths. When an end signal is received, those paths are assembled to form a complete route map, which is provided for users to search for routes.

20 Claims, 7 Drawing Sheets

ROUTE REPORTING METHOD, SYSTEM AND RECORDING MEDIUM USING THE SAME

CROSS-REFERENCE TO RELATED APPLICATION

This application claims the priority benefit of Taiwan application serial No. 98113527, filed on Apr. 23, 2009. The entirety of the above-mentioned patent application is hereby incorporated by reference herein and made a part of this specification.

BACKGROUND OF THE APPLICATION

With the continuous advancement and improvement of electronic technology and communication techniques, compact and portable electronic devices such as cellular phones, personal digital assistants (PDAs), and PDA phones are evolving rapidly. The portable electronic devices in the market now have integrated a greater number of functions to increase their competitiveness. Other than the conventional functions of taking photos, making phone calls, and surfing Internet, the global positioning system (GPS), the electronic map, and the navigation system are also integrated in a handheld communication device. A user can monitor his/her location through the electronic map and the GPS anytime, anywhere. In the meantime, the user can go for a destination by the planning and guiding of the navigation system.

However, before the navigation system is invented, a vocal route reporting method has been broadly used. The vocal reporting method basically indicates a route finder how to reach a destination through route marks and directions described by a route reporter. Accordingly, the describing ability of the route reporter and the memory of the route finder usually affect the result of whether the route finder can find the destination successfully. However, currently, besides papers and pens, there are no other tools that can assist the route reporter in drawing the route map and recording the vocal route reporting content.

SUMMARY OF THE APPLICATION

In light of the above, the present application provides a route reporting method, in which paths are drawn to establish a route map according to moving trajectories of touches detected by a touch screen, so as to resolve foregoing problems.

According to one embodiment of the present application, a reporting method suitable for a mobile device with a touch screen is provided. The present method detects a touch with the touch screen and draws a path according a moving trajectory of the touch. Wherein, when detecting the touch is finished, a dialog block is displayed to insert route mark information in the drawn path. The foregoing steps are repeated for drawing a plurality of paths. When an end signal is received, the plurality of drawn paths are assembled to form a complete route map.

According to one embodiment of the present application, a route reporting system comprising a touch screen and a path drawing module is provided. The touch screen is used for detecting a touch. The route drawing module is used for drawing a path according to a moving trajectory of the touch and assembling a plurality of drawn paths to form a route map when receiving an end signal. Wherein, when detecting the touch is finished, a dialog block is displayed to insert route mark information in the drawn path.

The present application further provides a recording medium for storing a computer program, which is used to execute the aforementioned route reporting method. Basically, the computer program is assembled by a plurality of program sections (i.e. an organization diagram building program section, a list approving program section, a setting program section, and a deploying program section). Moreover, after the plurality of program sections are loaded to the mobile device and executed, the steps of the route reporting method and the functions of the route reporting system can be accomplished.

In order to make the aforementioned and other objects, features and advantages of the present application more comprehensible, several embodiments accompanied with figures are described in detail below.

DESCRIPTION OF EMBODIMENTS

Figure 1:
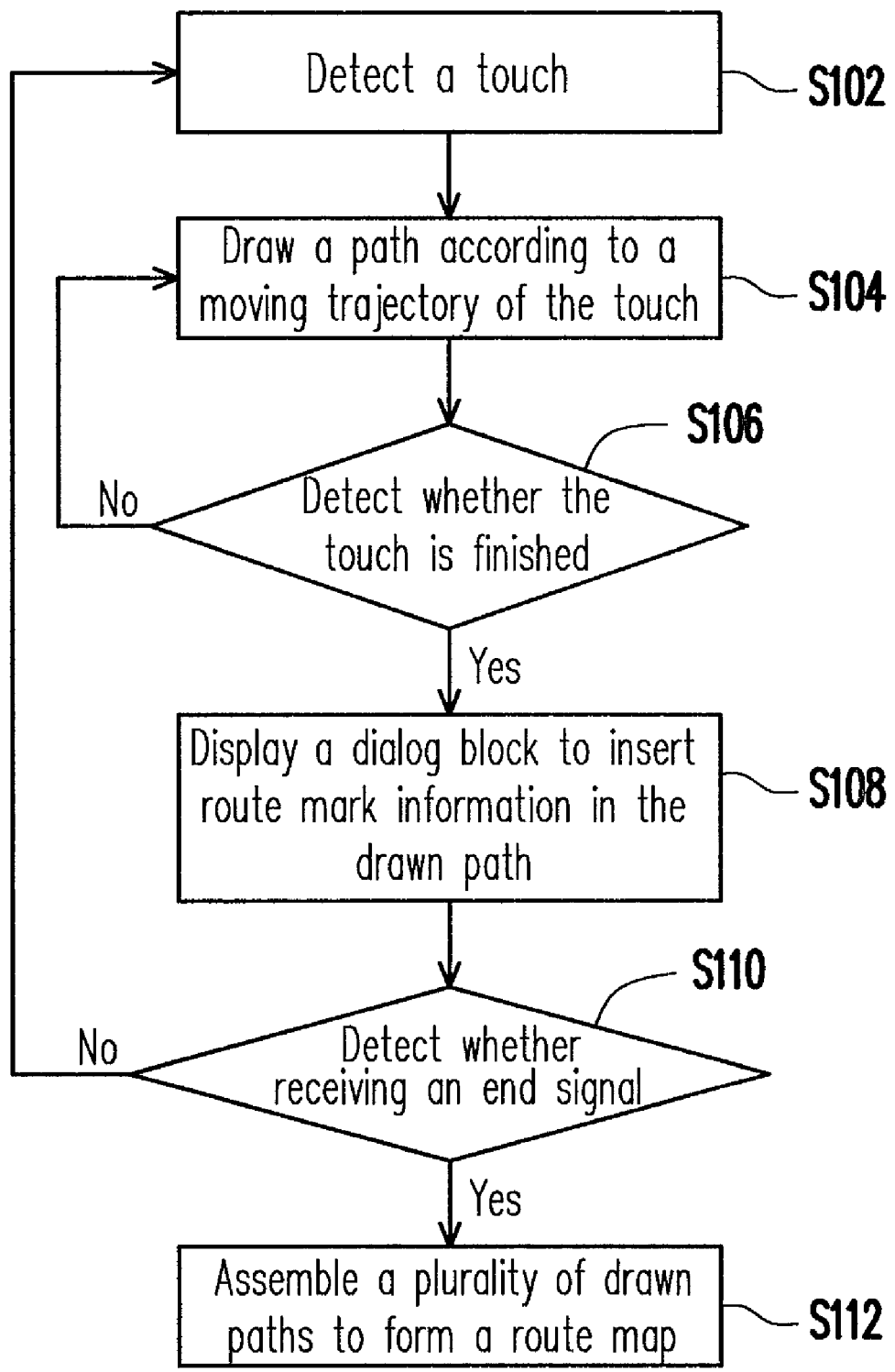
FIG. 1 is a flowchart illustrating a route reporting method for drawing a route map according to one embodiment of the present application.

FIG. 1 is a flowchart illustrating a route reporting method for drawing a route map according to one embodiment of the present application. The method is suitable for a mobile device with a touch screen, such as a cellular phone, a PDA, a PDA phone, a laptop, or a car PC. Please refer to FIG. 1. The steps in FIG. 1 are described as follows.

First, the mobile device uses the touch screen to detect a touch of a user (S102) and draws a path on a drawing page according to a moving trajectory of the touch (S104). In one embodiment, the mobile device additionally displays a path tool bar on the side of the drawing page. The path tool bar comprises a plurality of path drawing tools (e.g., a line drawing tool, or a curve drawing tool) and commonly used path objects (e.g., an intersection, or a circular path), which are provided for the user to draw corresponding paths or path objects.

In the process of drawing the path, the mobile device detects whether the aforementioned touch is finished (S106). When detecting the touch is finished (e.g., the user's finger leaves the touch panel of the mobile device), the mobile device automatically displays a dialog block on the drawn path for the user to insert route mark information in the drawn path (S108). In one embodiment, the mobile device may insert a character string in the dialog block input by the user at a path end of the drawn path as the route mark information of the path end. In another embodiment, the mobile device additionally displays a route mark tool bar on the side of the drawing page. The route mark tool bar comprises a plurality of commonly used route mark icons (e.g., a hospital icon, a school icon, a train station icon, a park icon, a convenient store icon, or a traffic sign), which are provided for the user to select to insert in the path end of the drawn path as the route mark information of the path end.

It should be noted herein that, in another embodiment of the present embodiment, when detecting the touch is finished, the mobile device may display another dialog block on the drawn path to insert a character string input by the user as a path information of the drawn path. For example, the user may input a road name as the path information of the drawn path.

Finally, the mobile device determines whether to terminate the drawing of the route map according to receiving an end signal or not (S110). If an end signal is received (e.g., the user touches a drawing accomplished button), the mobile device assembles all the paths being drawn on the drawing page to form a complete route map (S112). On the other hand, if no end signal is received, the mobile device keeps detecting the touch input by the user to draw other paths (S102).

Figure 2:
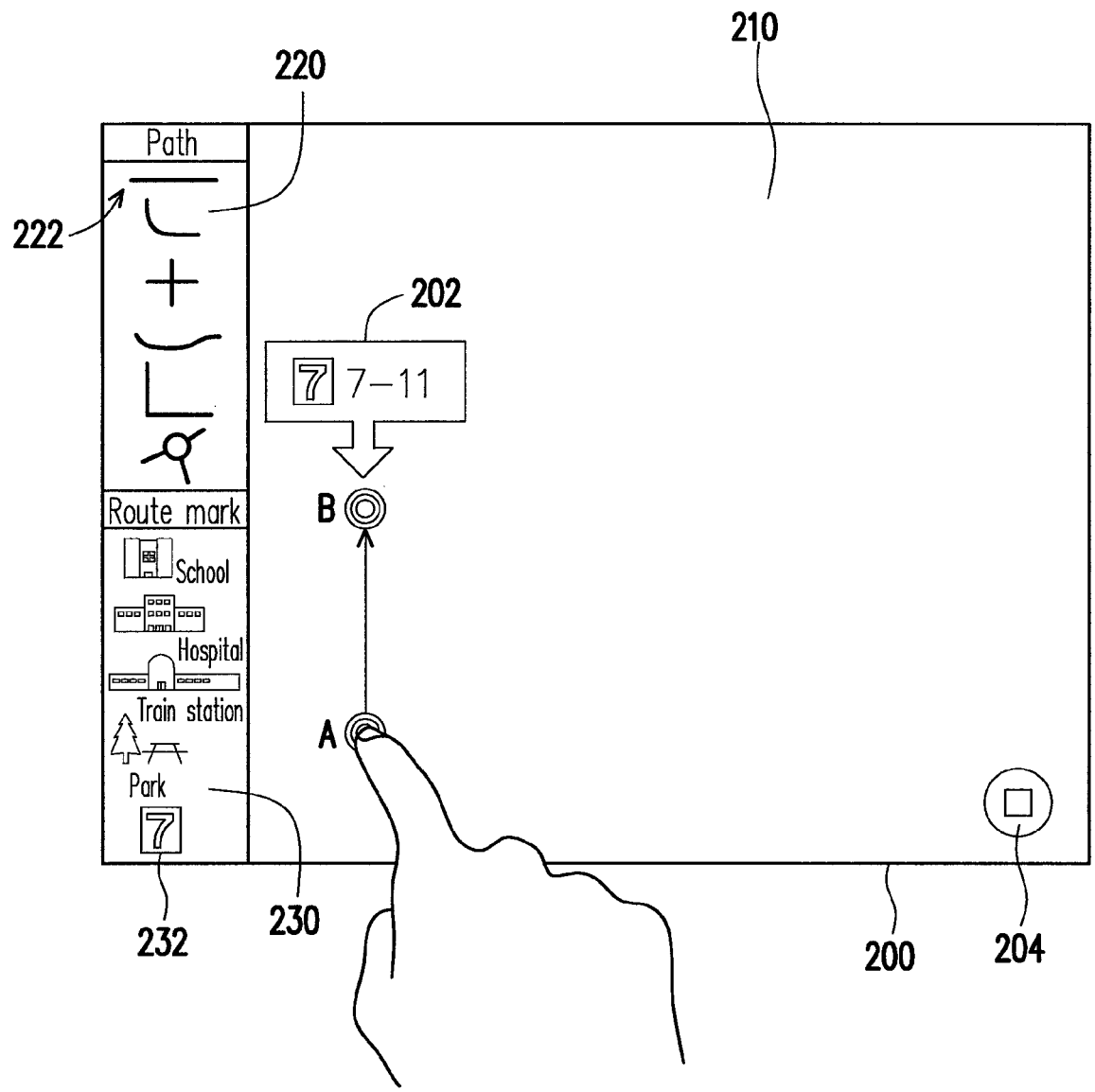
FIG. 2 is a schematic diagram illustrating an example of a route reporting method for drawing a route map according to one embodiment of the present application.

FIG. 2 is a schematic diagram illustrating an example of a route reporting method for drawing a route map according to one embodiment of the present application. Please refer to FIG. 2. In the present embodiment, a route map drawing interface 200 is displayed on a touch screen of a mobile device, and comprises a drawing page 210 on the right side and a path tool bar 220 and a route mark bar 230 on the left side. The user can select a path type he/she intends to draw from the path tool bar 220 and then draw a path on the drawing page 210 by touching and moving on the touch screen. For example, the user may touch the line drawing tool 222 to select a line drawing tool 222 from the path tool bar 220, and then move the finger from a start point A to an end point B on the drawing page 210 to draw a path. Accordingly, the mobile device will draw a path from the point A to the point B on the drawing page 210 in response to a moving trajectory of the user's finger on the touch screen. When the user's finger leaves the touch screen from the end point B, the mobile device displays a dialog block 202 at the end point B because of detecting the touch is finished. Then, the user can select a desired route mark icon from the route mark tool bar 230 on the left side or input a character string as the route mark of the path end. For example, when the user selects a 7-11 icon 232 from the route mark tool bar 230 and inputs a character string "7-11", the mobile device inserts the 7-11 icon 232 and the character string "7-11" in the end point B as the route mark information of the drawn path. However, the foregoing content is used as an example for illustration, but not used to limit the scope of the present application. In another embodiment of the present application, the mobile device may only insert the route mark icon selected by the user, or only insert the character string input by the user as the route mark of the path end. By repeating foregoing path drawing and route mark information inserting steps, a route map can be drawn in a short time. Finally, after all the drawings of the paths are accomplished, the user may end the drawing of the route map by touching an end button 204.

Figure 3:
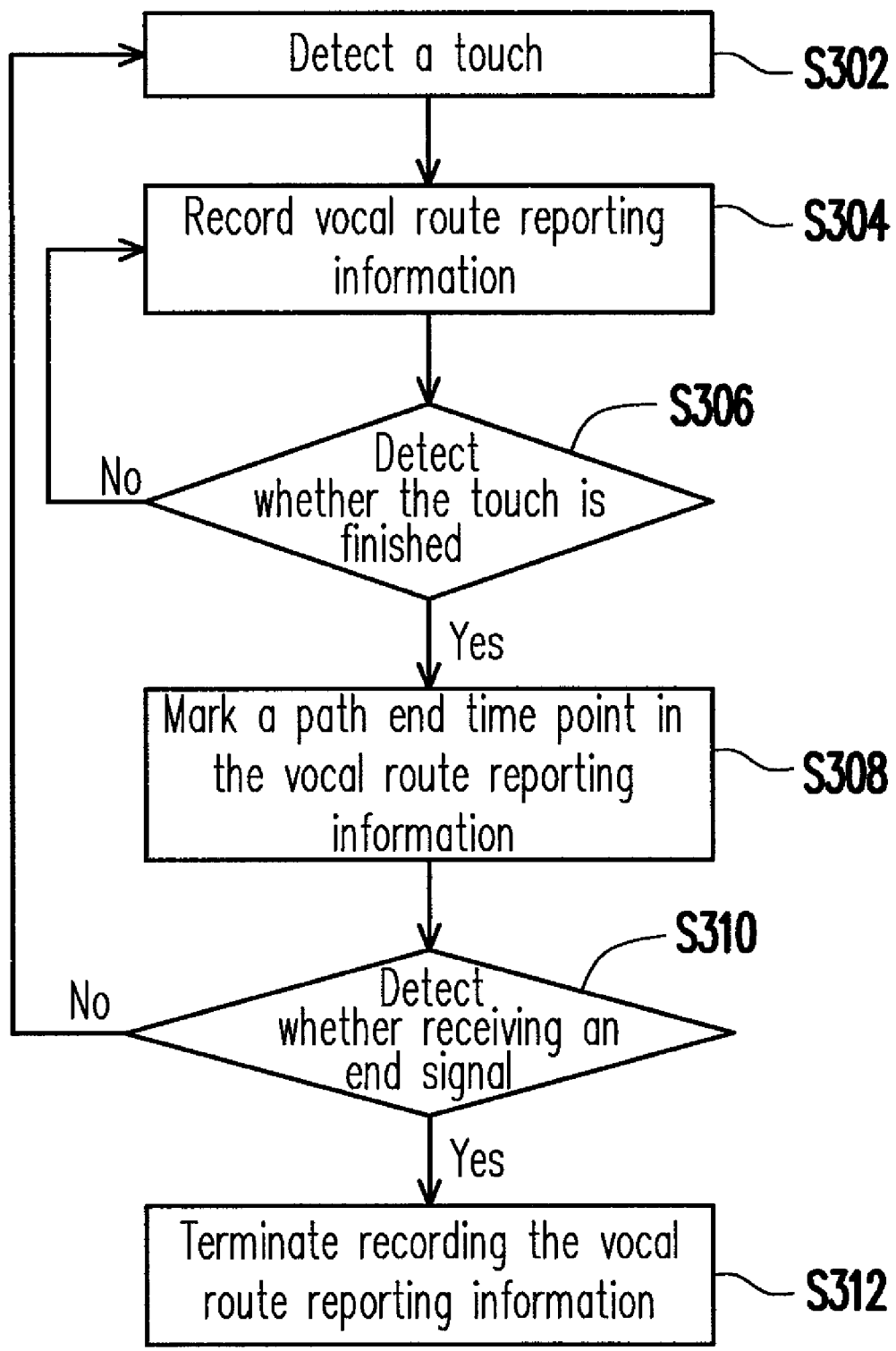
FIG. 3 is a flowchart illustrating a route reporting method for recording vocal route reporting information according to one embodiment of the present application.

To help a route finder recognize how to reach the destination more clearly, the route reporting method of the present application further comprises recording vocal route reporting information while drawing the route map. The vocal route reporting information is, for example, an illustration or a description of the route map given by the route reporter. Please refer to FIG. 3. FIG. 3 is a flowchart illustrating a route reporting method for recording vocal route reporting information according to one embodiment of the present application. The present embodiment is also suitable for a mobile device with a touch screen. The steps in FIG. 3 are described as follows.

First, the mobile device uses a touch screen disposed thereon to detect a touch of a user (S302) and starts recording vocal route reporting information when the touch screen first receives the touch (S304). In another embodiment, the mobile device additionally displays a recording time bar during recording the vocal route reporting information. Wherein, a length of the recording time bar corresponds to a time length of the recorded vocal route reporting information. In other words, the length of the recording time bar increases as the increment of the recording time.

Next, the mobile device detects whether the touch is finished (S306). When the touch is finished (e.g., the user's finger leaves the touch panel of the mobile device), the mobile device marks a path end time point in the recorded vocal route reporting information (S308). In one embodiment with displaying the recording time bar, when the mobile device detects that the touch is finished, it additionally inserts route mark information of the path corresponding to the path end time point at a position on the recording time bar corresponding to the path end time point. That is to say, the mobile device not only inserts the route mark information in the drawn path, but also inserts the route mark information in the displayed recording time bar, so as to remind the user of where the vocal route reporting information is played.

Next, after marking the path end time point, the mobile device detects whether receiving an end signal (S310). When receiving the end signal, the mobile device terminates recording the vocal route reporting information (S312). On the contrary, if no end signal is received, the mobile device keeps detecting the touch (S302) and recording the vocal route reporting information (S304).

It should be noted that, in another embodiment of the present embodiment, the mobile device can display the recording time bar and insert the route mark information into the recording time bar after receiving the end signal. However, the display of the recording time bar is not a limitation of the present application. In another embodiment of the present application, the mobile device may not display the recording time bar. Such design variation is also included in the scope of the present application.

Figure 4:
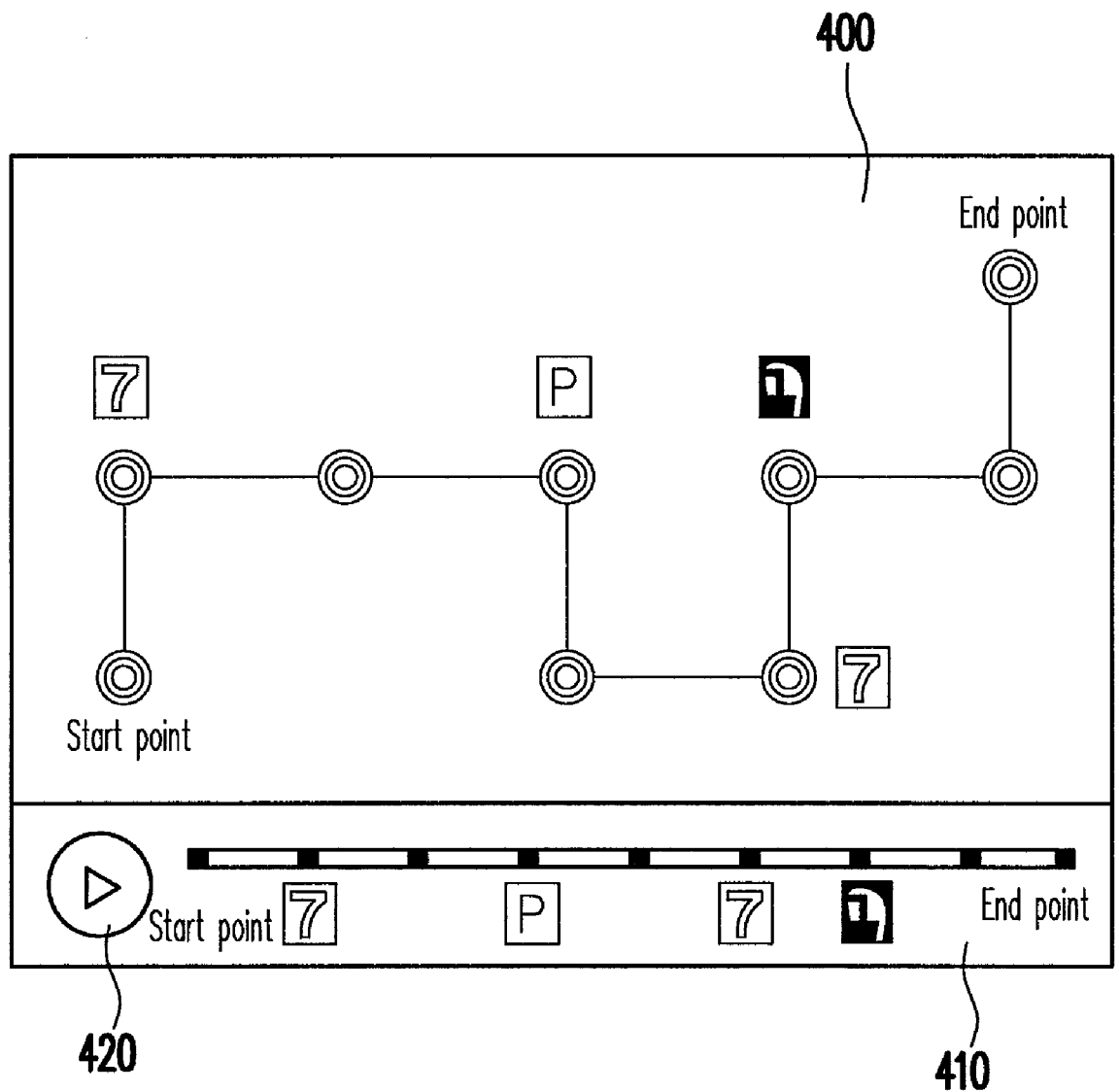
FIG. 4 is an example of a route map drawn according to a route reporting method of the present application.

Please refer to FIG. 4. FIG. 4 is an example of a route map drawn according to a route reporting method of the present application. As shown in FIG. 4, a recording time bar 410 is displayed under the route map 400. Wherein, each of the route mark icons on the recording time bar 410 is corresponding to a route mark icon of the path end on the route map 400. The user may play the vocal route reporting information by pressing a play button 420 on the left side of the recording time bar 410.

Figure 5:
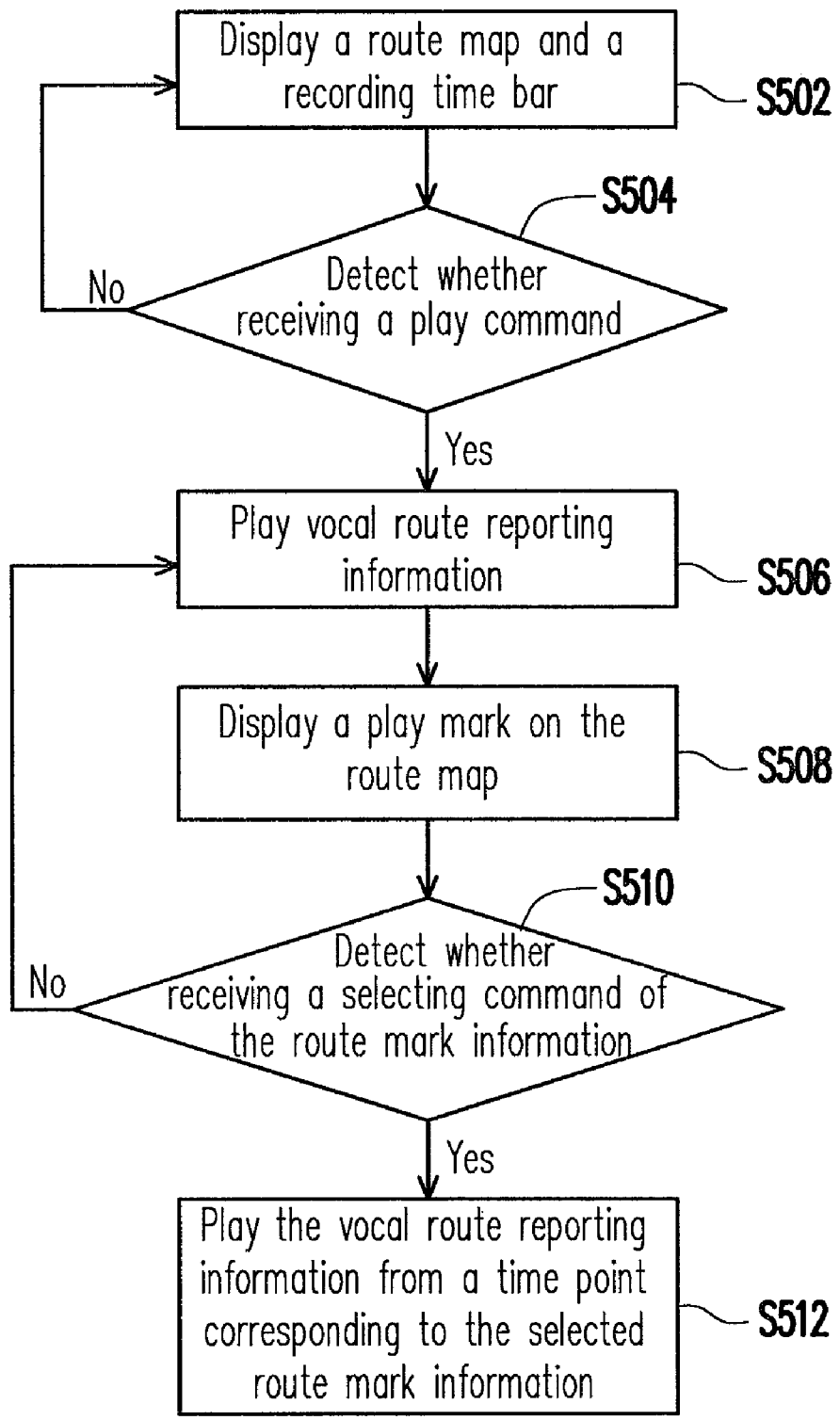
FIG. 5 is a flowchart illustrating a route reporting method for playing vocal route reporting information according to one embodiment of the present application.

Please refer to FIG. 5. FIG. 5 is a flowchart illustrating a route reporting method for playing vocal route reporting information according to one embodiment of the present application. The present method is suitable for the route map drawn by using aforementioned method to help the route finder recognize how to reach the destination more clearly. The steps in FIG. 4 are described as follows.

First, the mobile device displays a route map (S502), such as the route map 400 shown in FIG. 4. The route map can be obtained by, for example, sketching drawn by user on the mobile device or downloading from other mobile devices; however, this is not used to limit the scope of the present application.

Next, the mobile device detects whether receiving a play command (S504). When receiving the play command (e.g., the user presses the play button 420), the mobile device plays the vocal route reporting information (S506). While playing the vocal route reporting information, the mobile device also displays a play mark at a position on the route map corresponding to where the vocal route reporting information is played. Accordingly, the user can know which position on the route map the currently playing vocal route reporting information corresponds to by checking the position of the play mark on the route map. In addition, if the route map comprises a recording time bar (e.g., the recording time bar 410 shown in FIG. 4), the mobile device displays another play mark at a position on the recording time bar corresponding to where the vocal route reporting information is played. Accordingly, the user can know where the vocal route reporting information is now being played by checking the position of the play mark on the recording time bar.

Next, the mobile device detects whether receiving any select command of the route mark information on the route map (or on the recording time bar). When receiving the select command of a route mark information, the mobile device changes to play the recorded vocal route reporting information from the path end time point corresponding to the selected route mark information (S512). On the other hand, if the mobile device does not receive any select command of the route mark information, it keeps playing the vocal route reporting information (S506).

Figure 6:
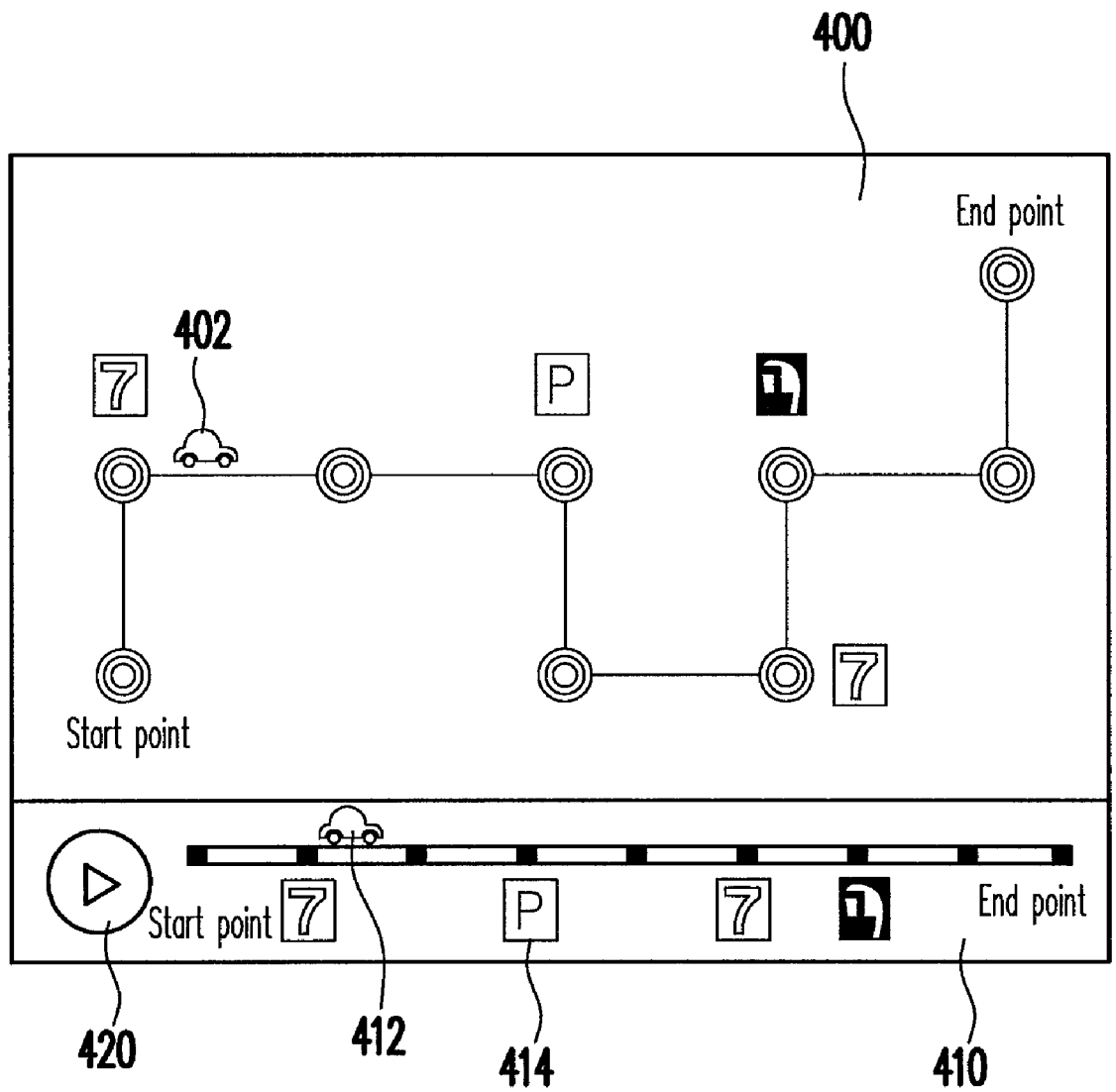
FIG. 6 is a schematic diagram illustrating an example of a route reporting method for playing vocal route reporting information according to one embodiment of the present application.

For example, FIG. 6 is a schematic diagram illustrating an example of a route reporting method for playing vocal route reporting information according to one embodiment of the present application. The route map shown in FIG. 6 is the same as the route map 400 shown in FIG. 4. While the vocal route reporting information is being played, a play mark 402 and a play mark 412 are respectively displayed on the route map 400 and the recording time bar 410. The play mark 402 is to indicate which position on the route map 400 corresponds to where the vocal route reporting information is currently played. The play mark 412 is to indicate which position on the time bar 410 corresponds to where the vocal route reporting information is currently played. In addition, while the vocal route reporting information is being played, the user can select any one of the route mark icons on the route map 400 or on the recording time bar 410 (e.g., the route mark icon 414). Once a route mark icon is selected, the vocal route reporting information is changed to be played from the selected route mark icon according to the user preference.

The present application also provides a hardware device for the aforesaid route reporting method, such that the method may be applied to the mobile device such as a cellular phone, a PDA, a PDA phone, a laptop, or a car PC. Another embodiment is described in detail hereinafter.

Figure 7:
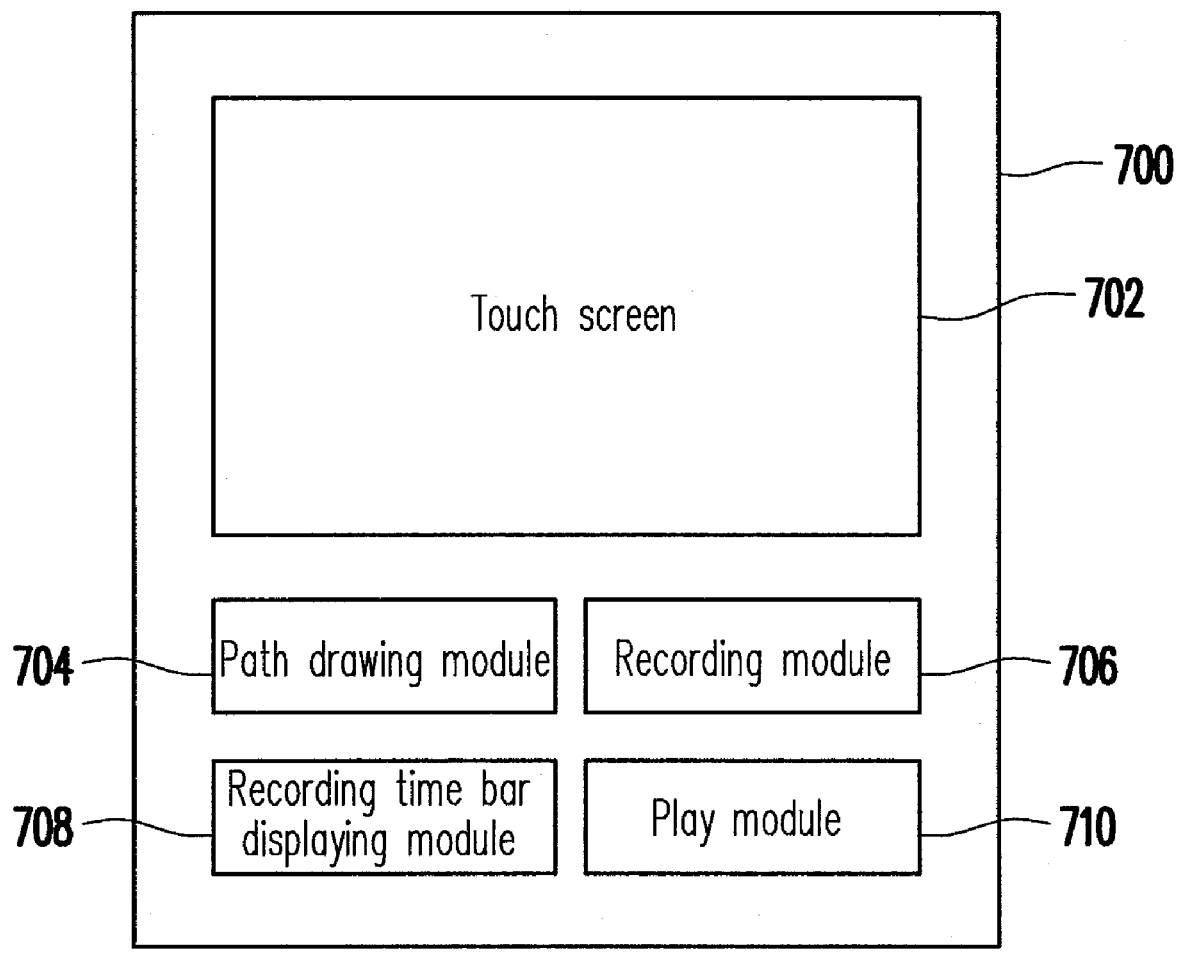
FIG. 7 is a block diagram of a route reporting system according to one embodiment of the present application.

FIG. 7 is a block diagram of a route reporting system according to one embodiment of the present application. Please refer to FIG. 7. A route reporting system 700 of the present embodiment comprises a touch screen 702, a route drawing module 704, a recording module 706, a recording time bar displaying module 708, and a play module 710. The functions thereof are described respectively in the following.

The touch screen 702 is, for example, a resistive touch screen, a capacitive touch screen, a single-point touch screen, or a multiple-point touch screen, for detecting a touch of a user. The route drawing module 704 is used for drawing a path on the touch screen 702 according to a moving trajectory of the touch detected by the touch screen 702 and assembling a plurality of drawn paths to form a route map.

Furthermore, when the route drawing module 704 detects that the touch is finished, it displays a dialog block on the touch screen for a user to insert route mark information in the drawn path.

It should be noted that the route reporting system 700 further comprises a route mark icon selecting module (not shown) for displaying a plurality of route mark icons and inserting a route mark icon which is selected based on a selecting signal received by the touch screen 702 at a corresponding path end as the route mark information of the path end. In addition, the route reporting system 700 comprises a character string input module for inserting a character string input into the route reporting system 700 at a corresponding path end as the route mark information of the path end.

The recording module 706 starts recording vocal route reporting information when the touch screen 702 first detects a touch from a user, and keeps recording the vocal route reporting information until the drawing of the route map is accomplished. The recording time bar displaying module 708 displays a recording time bar on the touch screen 702, and a length of the recording time bar corresponds to a time length of the vocal route reporting information recorded by the recording module 706.

Wherein, the recording module 706 further marks a path end time point in the vocal route reporting information when the touch screen detects the touch is finished. The recording time bar displaying module 708 further inserts the route mark information of the paths corresponding to the path end time points at a plurality of positions on the recording time bar corresponding to the path end time points.

The play module 710 is used for playing the vocal route reporting information previously recorded by the recording module 706 when receiving a play command. While playing the vocal route reporting information, the play module 710 also controls the recording time bar displaying module 708 to display a play mark on the recording time bar, and the position of the play mark on the recording time bar indicates where the vocal route reporting information is played. In addition, the play module 710 controls the route drawing module 704 to display a play mark on the route map, and the position of the play mark on the route map indicates which position on the route map the currently playing vocal route reporting information corresponds to.

The present application further provides a recording medium for storing a computer program, which is used to execute the aforementioned route reporting method. Basically, the computer program is assembled by a plurality of program sections (i.e. an organization diagram building program section, a list approving program section, a setting program section, and a deploying program section). Moreover, after the plurality of program sections are loaded to the mobile device and executed, the steps in the route reporting method and the functions of the route reporting system can be accomplished.

In summary, the route reporting method, the route reporting system, and the recording medium using the same report a route through drawing a route map according to the touch received by the touch screen. When the touch is finished, the present application automatically displays a dialog block to insert a route mark or a path name, so as to help the route reporter to establish the route map quickly. In addition, the present application further records the vocal route reporting information corresponding to the route map, so as to further help the user to reach the destination more smoothly.

Although the present application has been described with reference to the above embodiments, application of the present application is not limited to these embodiments. It will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A route reporting method, suitable for a mobile device with a touch screen, comprising:
   detecting a touch with the touch screen;
   starting recording vocal route reporting information;
   drawing a path according a moving trajectory of the touch;
   displaying a dialog block to insert route mark information in the drawn path;
   repeating foregoing steps to draw a plurality of paths;
   terminating recording the vocal route reporting information and assembling the plurality of paths to form a route map when receiving an end signal; and
   displaying a recording time bar.

2. The route reporting method of claim 1, wherein the step of displaying the dialog block to insert the route mark information in the drawn path comprises:
   displaying the dialog block at a path end of the drawn path;
   receiving a selecting signal and selecting one of a plurality of route mark icons according to the selecting signal; and
   displaying the selected route mark icon at the path end as the route mark information of the path end.

3. The route reporting method of claim 1, wherein the step of displaying the dialog block to insert the route mark information in the drawn path comprises:
   displaying the dialog block at a path end of the drawn path;
   receiving an input character string; and
   displaying the input character string at the path end as the route mark information of the path end.

4. The route reporting method of claim 1, further comprising:
   displaying another dialog block to insert path information in the drawn path when detecting the touch is finished.

5. The route reporting method according to claim 4, wherein the step of displaying the another dialog block to insert the path information in the drawn path comprises:
   displaying the another dialog block on the drawn path;
   receiving an input character string; and
   displaying the input character string in the drawn path as the path information of the drawn path.

6. The route reporting method of claim 1,
   wherein a length of the recording time bar corresponds to a time length of the recorded vocal route reporting information.

7. The route reporting method of claim 1, further comprising:
   marking a path end time point in the vocal route reporting information when detecting the touch is finished; and
   repeating foregoing steps to mark a plurality of path end time points; and
   the step of displaying the recording time bar further comprises:
   displaying the route mark information of the path ends corresponding to the path end time points at a plurality of positions on the recording time bar corresponding to the path end time points.

8. The route reporting method of claim 7, wherein after the step of terminating recording the vocal route reporting information, the method further comprises:
   receiving a play command; and
   playing the recorded vocal route reporting information.

9. The route reporting method of claim 8, wherein the step of playing the recorded vocal route reporting information further comprises:
   receiving a select command of one of the route mark information displayed on the recording time bar; and
   playing the recorded vocal route reporting information from the path end time point corresponding to the selected route mark information.

10. The route reporting method of claim 8, wherein the step of playing the recorded vocal route reporting information further comprises:
    receiving a select command of one of the route mark information displayed on the route map; and
    playing the recorded vocal route reporting information from the path end time point corresponding to the selected route mark information.

11. The route reporting method of claim 8, wherein the step of playing the recorded vocal route reporting information further comprises:
    displaying a play mark at a position on the recording time bar corresponding to where the vocal route reporting information is played.

12. The route reporting method of claim 8, wherein the step of playing the recorded vocal route reporting information further comprises:
    displaying a play mark at a position on the route map corresponding to where the vocal route reporting information is played.

13. A recording medium used for storing a computer program, said computer program comprising a plurality of codes used for being loaded into a mobile device and enabling the mobile device to execute the route reporting method of claim 1.

14. A route reporting system, comprising:
    a touch screen, for detecting a touch; and
    a route drawing module, for drawing a path according to a moving trajectory of the touch and assembling a plurality of drawn paths to form a route map when receiving an end signal, wherein
    a dialog is displayed to insert route mark information in the drawn path
    a recording module, for starting recording vocal route reporting information when the touch screen first detects the touch, and terminating recording the vocal route reporting information when the route drawing module receives the end signal for terminating recording; and
    a recording time bar displaying module, for displaying a recording time bar.

15. The route reporting system of claim 14, further comprising:
    a route mark icon selecting module, for displaying a plurality of route mark icons, selecting one of the route mark icons to insert at a path end of the drawn path as the route mark information of the path end according to a selecting signal received by the touch screen.

16. The route reporting system of claim 14, further comprising:
    a character string input module, for generating an input character string according to the touch detected by the touch screen, inserting the input character string at a path end of the drawn path as the route mark information of the path end.

17. The route reporting system of claim 14, wherein the route drawing module further comprises:
    displaying another dialog block to insert path information in the drawn path when detecting the touch is finished.

18. The route reporting system of claim 14,
wherein a length of the recording time bar of the recording time bar display module corresponds to a time length of the recorded vocal route reporting information.

19. The route reporting system of claim 14, further comprising:
a play module, for playing the vocal route reporting information recorded by the recording module when receiving a play command.

20. The route reporting system of claim 14, wherein the system comprises being disposed in a mobile device, which comprises a cellular phone, a PDA, a PDA phone, a laptop, or a car PC.

* * * * *